United States Patent
Németh et al.

(10) Patent No.: US 8,532,228 B2
(45) Date of Patent: Sep. 10, 2013

(54) AUTOMATIC FREQUENCY OFFSET COMPENSATION IN ZERO-INTERMEDIATE FREQUENCY RECEIVERS USING MINIMUM-SHIFT KEYING (MSK) SIGNALING

(75) Inventors: József G. Németh, Budapest (HU); Péter Szilveszter Kovács, Santa Clara, CA (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 13/331,089

(22) Filed: Dec. 20, 2011

(65) Prior Publication Data
US 2012/0163504 A1 Jun. 28, 2012

Related U.S. Application Data

(60) Provisional application No. 61/426,864, filed on Dec. 23, 2010.

(51) Int. Cl.
*H04L 27/14* (2006.01)
(52) U.S. Cl.
USPC ........... 375/336; 375/303; 375/329; 375/340; 375/346
(58) Field of Classification Search
USPC ............... 375/336, 303, 329, 340, 346
See application file for complete search history.

(56) References Cited

U.S. PATENT DOCUMENTS

| | | | |
|---|---|---|---|
| 2009/0168849 A1 | 7/2009 | Rouxel | 375/140 |
| 2011/0019782 A1* | 1/2011 | Kobayashi et al. | 375/344 |
| 2011/0116562 A1* | 5/2011 | Li et al. | 375/260 |
| 2012/0014467 A1* | 1/2012 | Lindgren et al. | 375/260 |

FOREIGN PATENT DOCUMENTS

| | | |
|---|---|---|
| EP | 1710967 A2 | 10/2006 |
| EP | 1793551 A2 | 6/2007 |

OTHER PUBLICATIONS

International PCT Search Report and Written Opinion, PCT/US2011/066523, 11 pages.

* cited by examiner

*Primary Examiner* — Kabir A Timory
(74) *Attorney, Agent, or Firm* — King & Spalding L.L.P.

(57) ABSTRACT

Carrier frequency offset (CFO) between a transmitter and receiver signaling at 2 Mbps data rate with a 11110000 pattern as the preamble period is corrected within one preamble time period using free-running coarse and fine carrier frequency offset estimations. Two estimates for the CFO are computed, coarse and fine. The fine one is computationally accurate but may not be correct because of a potential wrap at ±180° in the computation. The coarse one is not accurate but delivers the approximate CFO value without wrap over. The comparison between the coarse and fine estimates thus may be used to detect a wrap over in the fine estimate and modify the fine estimate accordingly. Thereafter the compensated fine CFO estimation is used for carrier frequency offset (CFO) compensation.

18 Claims, 7 Drawing Sheets

AUTOMATIC FREQUENCY OFFSET COMPENSATION IN ZERO-INTERMEDIATE FREQUENCY RECEIVERS USING MINIMUM-SHIFT KEYING (MSK) SIGNALING

RELATED PATENT APPLICATION

This application claims priority to commonly owned U.S. Provisional Patent Application Ser. No. 61/426,864; filed Dec. 23, 2010; entitled "Automatic Frequency Control in Zero-Intermediate Frequency Receivers Using Minimum-Shift Keying (MSK) Signaling," by József G. Németh and Péter Sz. Kovács; which is hereby incorporated by reference herein for all purposes.

TECHNICAL FIELD

The present disclosure relates to digital communications, and more particularly, to automatic frequency control in zero-intermediate frequency receivers receiving minimum-shift keying (MSK) signaling.

BACKGROUND

The carrier frequencies of the transmitters and receivers (transceivers) used in mobile wireless devices are synthesized from fixed, limited accuracy crystal oscillators. Thus in a pair of communicating wireless devices there may be a difference between the carrier frequencies of the respective transmitter and receiver and the difference, the carrier offset, shows up in the demodulated baseband signal. Although digital techniques can remove the effects of the carrier offset (CFO) by modifying the received signal stream as if it had been demodulated with the recovered transmitter carrier frequency; it is still called Automatic/Adaptive Frequency Control (AFC). The transformation caused by the carrier offset is deterministic but the signal stream also carries noise. Not to become the bottleneck, an AFC digital technique should tolerate noise at least as well as the rest of the baseband processing does.

The time it takes for the AFC to determine the carrier offset ("lock onto the transmitter carrier") lengthens the required transmit frame preamble, thus shortens (through the increase in radio on-time) battery life, hence raises the operating costs of a wireless device. The amount of carrier offset the AFC can compensate determine the required oscillator crystal tolerance, hence influences the purchasing cost of a device.

The requirement on crystal accuracy becomes stricter with increasing payload bit rate. In multi-rate wireless transceivers the crystal accuracy must satisfy the requirement for the highest bit rate that may be counterproductive for the low cost applications at the lower bit rates. Such is the case with ieee802.15.4 wireless transceivers that also have a proprietary operating mode with 125 k-250 k-500 k-1M-2M bps bit rates or a subset thereof.

SUMMARY

Therefore, what is needed is way for automatic frequency control (AFC) that relaxes crystal accuracy requirements for proprietary 1 and 2 Mbps data rates in IEEE 802.15.4 compatible wireless transceivers.

According to the teachings of this disclosure a method using a MSK modulated preamble composed of repetitions of a specially selected 11110000 preamble pattern computes a free running fine estimate for a carrier frequency offset (CFO) from the correlation of two samples of the input signal preamble period length apart, repeating the calculation for each new sample received and filtering the results. The method computes, in parallel to the calculation of the fine CFO estimate, a free running coarse estimate for the CFO by averaging the results from two correlations computed half a preamble period length apart with each pair of samples used in the computations one MSK symbol length apart, repeating the calculation for each new sample received and filtering the results. The method then compares the fine estimate that is accurate except for a possible wrap over at ±180° and the coarse estimate that is far less accurate but free from wrapover. The method modifies the fine estimate if the difference between the coarse and fine estimate is greater than a predetermined threshold, an indication that a wrap over did occur in the computation fine estimate. Thereafter the correct fine estimate is used for the AFC.

According to an embodiment, a method for automatic frequency offset compensation in a zero-intermediate frequency receiver demodulating minimum-shift keying (MSK) signals may comprise the steps of: running a coarse carrier frequency offset estimation; running a fine carrier frequency offset estimation; determining whether an expected preamble of a MSK signal has been detected, wherein if the expected preamble has not been detected then continue running the coarse and fine carrier frequency offset estimations, and if the expected preamble has been detected then stop running the coarse and fine carrier frequency offset estimations; calculating an absolute difference between the coarse and fine carrier frequency offset estimations determining whether the absolute difference is less than a threshold value, wherein if the absolute difference is less than the threshold value then using the fine carrier frequency offset estimation for compensating the carrier frequency offset, and if the absolute difference is equal to or greater than the threshold value then adjusting the fine carrier frequency offset estimation by adding or subtracting 180 degrees per period thereto until the absolute difference is less than the threshold value, and thereafter using the adjusted fine carrier frequency offset estimation for compensating the carrier frequency offset.

According to a further embodiment of the method, the expected preamble results in a direct current (DC) free demodulated signal. According to a further embodiment of the method, the expected preamble is eight MSK symbols may comprise: four logic ones having positive phase rotations; and four logic zeros having negative phase rotations. According to a further embodiment of the method, the MSK signals run at a two megabaud MSK symbol rate. According to a further embodiment of the method, the fine carrier frequency offset estimation is determined by running autocorrelation with one preamble period time lag. According to a further embodiment of the method, the coarse carrier frequency offset estimation is determined by averaging the result of running two autocorrelations four symbols apart with an MSK symbol time lag. According to a further embodiment of the method, lowpass filtering the average to remove signal noise therein. According to a further embodiment of the method, the coarse and the fine carrier frequency offset estimations are free running until the preamble is detected. According to a further embodiment of the method, the step of compensating the carrier frequency offset is done by de-rotating a coarse I/Q waveform of the MSK symbols.

BRIEF DESCRIPTION OF THE DRAWINGS

A more complete understanding of the present disclosure may be acquired by referring to the following description taken in conjunction with the accompanying drawings wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Figure 1:
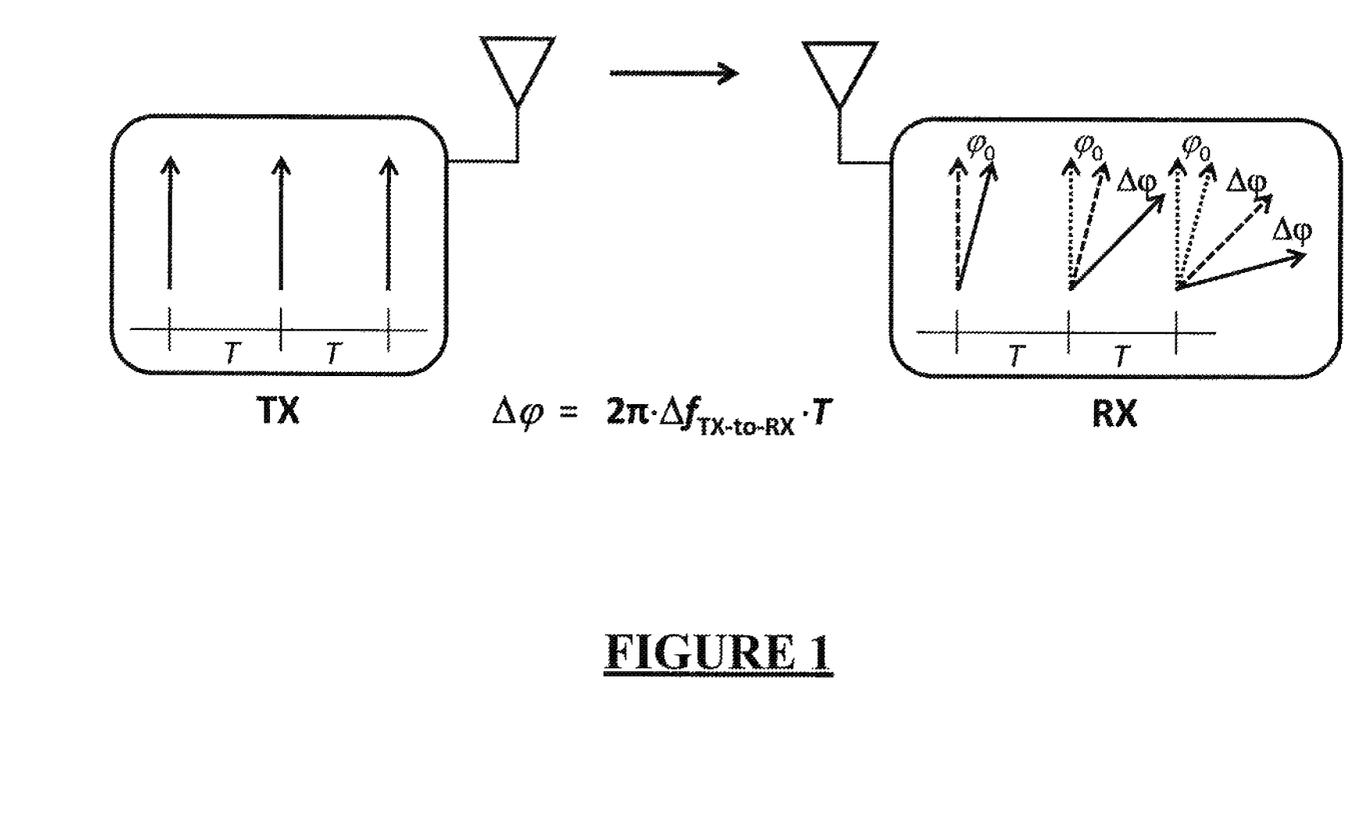
FIG. 1 illustrates a textbook graphical representation of carrier frequency offset (CFO) between a transmitter and receiver that introduces rotation into the received signal vector.

It is a textbook fact that the carrier offset $\Delta f_{TX\text{-}to\text{-}RX}$ introduces rotation into I-Q demodulation as shown on FIG. 1. (The random initial phase, $\phi_0$, depends on such factors as the propagation delay from transmitter to receiver and the random initial phases of the carriers during modulation/demodulation.)

Accordingly the instruction for the outline of an AFC method may be as follows:

Estimate $\phi_0$ and $\Delta\phi$ at the beginning of the frame and 'rotate each received symbol backwards' by the accumulated phase ($\phi_0+\Delta\phi$, $\phi_0+2*\Delta\phi$, $\phi_0+3*\Delta\phi$, . . . ) before further processing. Additionally, use a sufficiently long waveform in the computation of $\phi_0$ and $\Delta\phi$ in order to cancel/diminish the effect of noise present in the signal.

In some cases, specifically in the method covered by this disclosure, determination of $\phi_0$ is not required. Also, the term 'rotate the symbol stream backwards by $\Delta\phi$' is generally used to describe the process.

Figure 2:
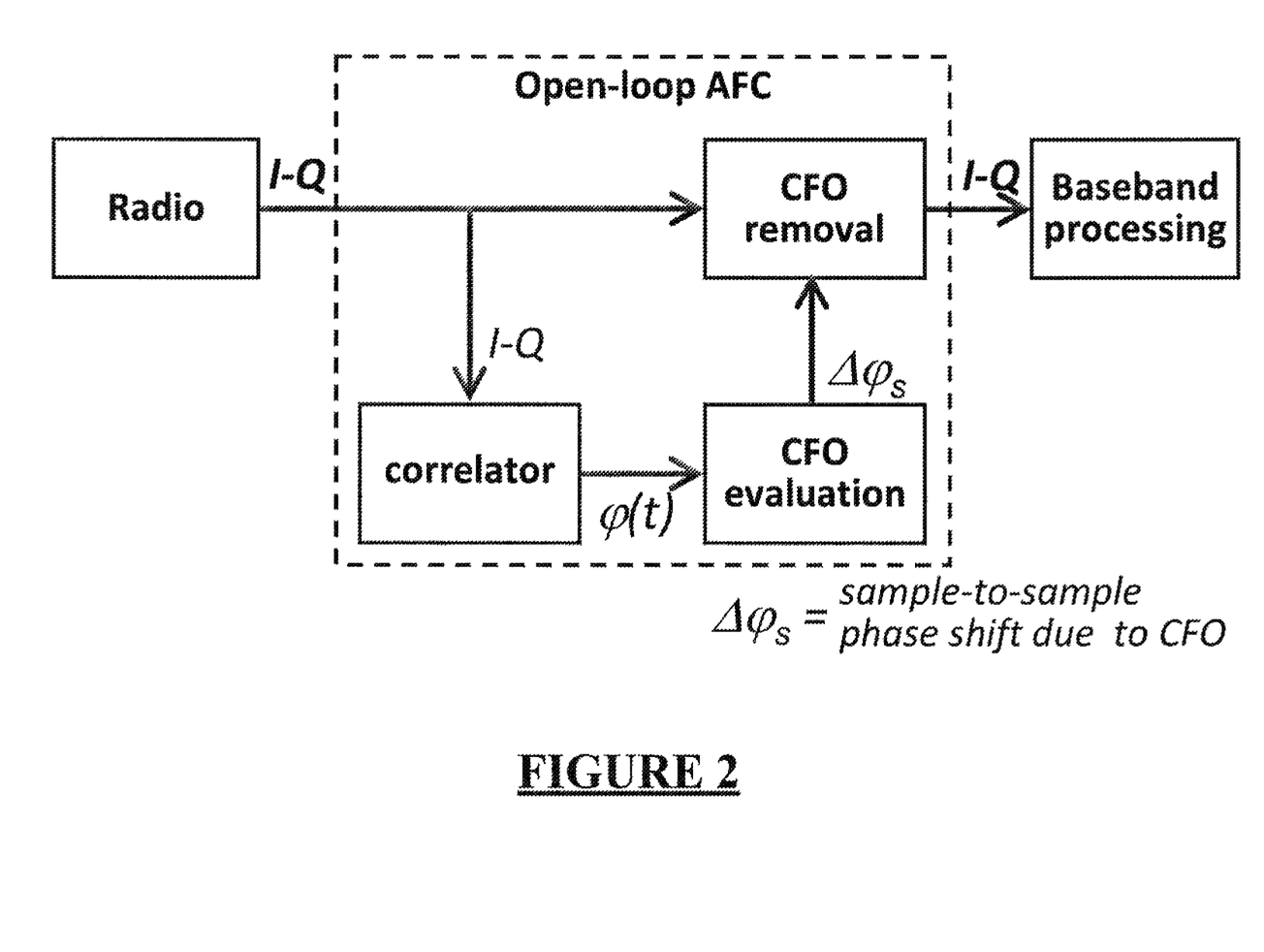
FIG. 2 illustrates a conceptual structure of an automatic frequency control (AFC) module and its placement in the digital part of a receiver.

The conceptual structure and the placement of the open-loop AFC module are shown on FIG. 2. The computation is done with the sampled version of the involved signal waveforms; in the compensation ("back rotation") the amount of the phase shift due to the CFO between two consecutive samples is used.

We are looking for a method that is applicable in a zero-IF MSK receiver. Such receiver requires a minimum 8 MSK symbol, DC-free preamble pattern. The 11110000 sequence that meets these requirements is selected as a period of the frame preamble.

Figure 3:
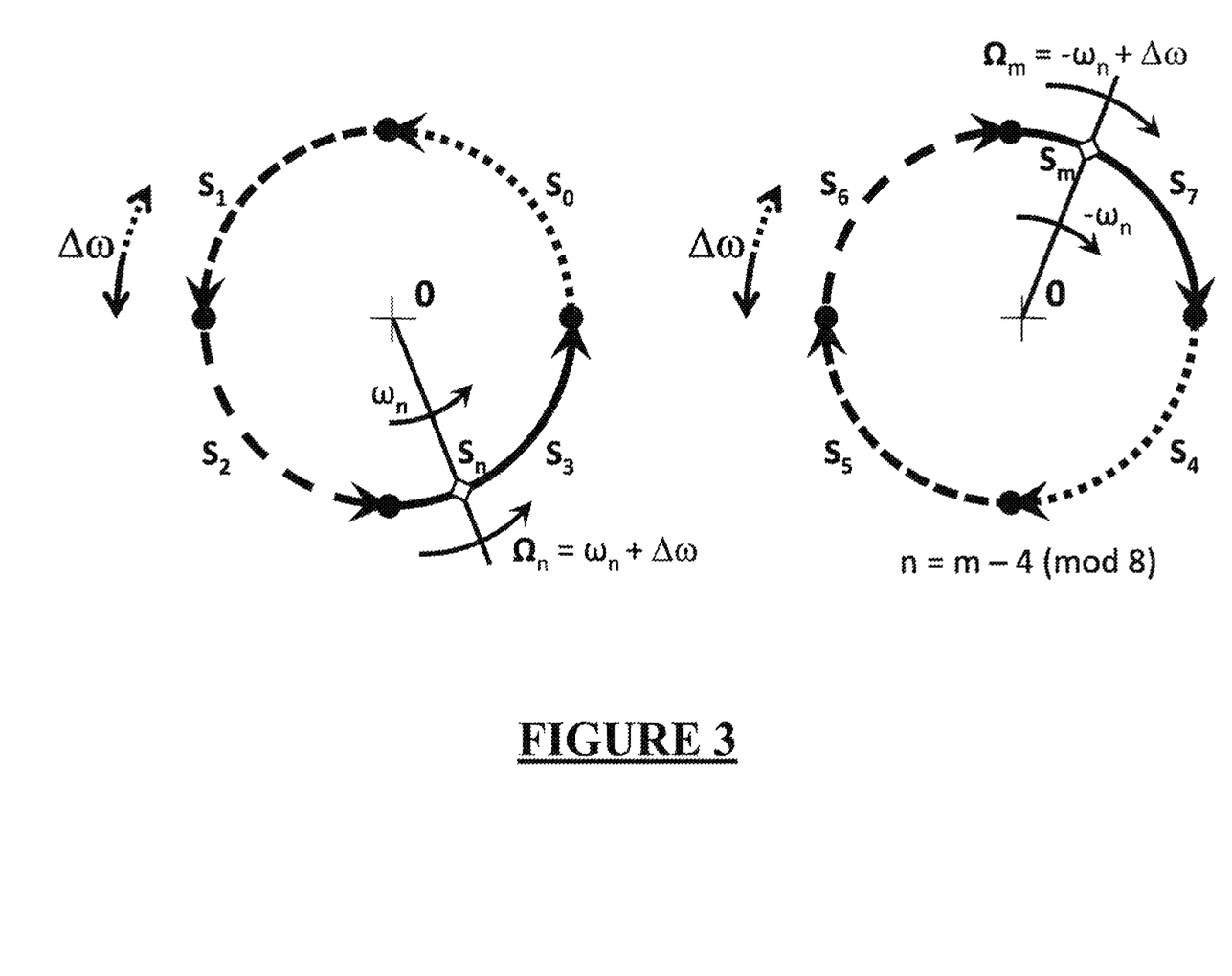
FIG. 3 illustrates graphically relationships that provide a foundation for computing coarse carrier frequency offset estimates.
Figure 4:
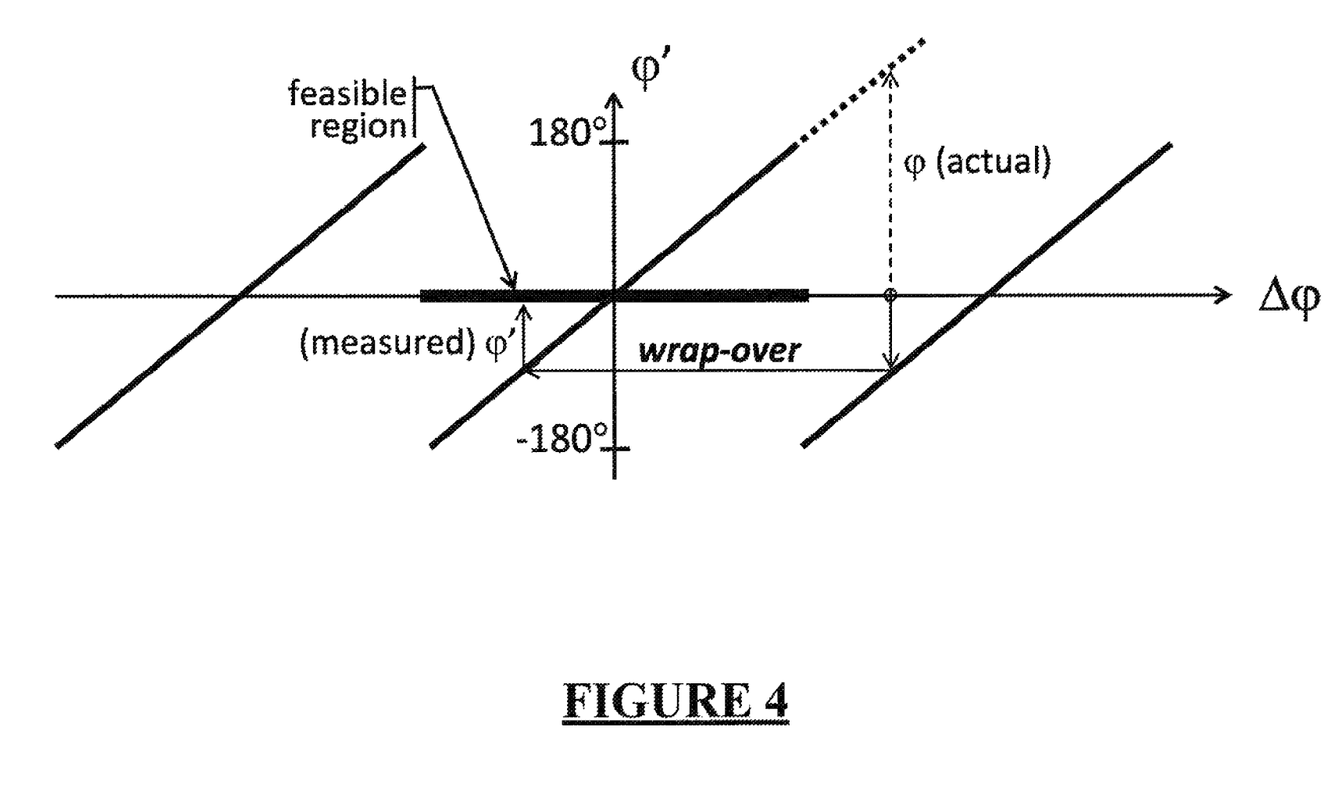
FIG. 4 illustrates the effect of wrap over at +180° on the result of a phase computation example.

This pattern shows up in the I-Q plane as four +90° rotations followed by four −90° rotations, as illustrated on FIG. 3.

If the signal is sampled at the rate of N samples per MSK symbol the consecutive samples rotate 90/N degrees in the direction the corresponding MSK symbol does.

The property important for a free running fine $\Delta\phi$ estimation evident from FIG. 3 is that, in the ideal, noiseless and CFO free, case signal vectors 8*N sample (the length of the preamble period) apart are identical. It follows that the phase of the correlation vector of the two samples is 0. That is $$\Phi(S_i * \overline{S}_{i+8*N}) = 0$$

where overstrike denotes the complex conjugate. If a CFO of $\Delta\omega$ is present it introduces an additional signed $\Delta\phi = 2\pi*\Delta\omega*T$ sample-to-sample shift (T is the sampling period) that accumulates to $\phi = 8*N*\Delta\phi$ during the preamble period. At the same time the correlation vector above yields $$\Phi(S_i * \overline{S}_{i+8*N}) = \phi'$$

While $\phi$ falls within the ±180° range $\phi' = \phi$ and $\Delta\phi = \phi'/(8*N)$.

As the correlation is repeated for sample position by sample position and the resulting phase shifts are averaged the effect of noise from the input is diminished in the results. Let us denote with $\Delta\phi_{FINE}$ the sample-to-sample phase shift $\Delta\phi$ thus computed.

The limitation of the method is that a wrap-over can occur in the computation of $\phi'$ at ±180° as illustrated on FIG. 3.

However, even if wrap-over occurs the $\Delta\phi_{FINE}$ result can still be used if the potential wrap-over and its direction can be detected. This can be achieved if we can compute a $\Delta\phi$ estimate from the correlation of samples close enough that wrap-over could not occur at the given crystal tolerance. The result, $\Delta\phi_{COARSE}$, will be less accurate but good enough that the value $|\Delta\phi_{COARSE} - \Delta\phi_{FINE}|$ may be used as an indicator of wrap-over. It will be significantly smaller if the difference is due to noise and computational accuracy only than in the case when a wrap-over has occurred.

The clue to the free running coarse $\Delta\phi$ estimation again can be found on FIG. 3. The important observation is that samples at 4 symbol (4*N sample) distances always rotate in opposite directions; while the direction of the additional rotation caused by the CFO is the same over the full preamble.

Thus the sample-to-sample phase shift of the vectors in the pair above is $-90/N+\Delta\phi$ and $90/N+\Delta\phi$ degrees respectively. Thus in the sum of the two values the phase shifts from the rotation of the CFO free symbol vector itself is cancelled out. This also holds for the accumulated phase shifts while we move from one pair to another pair further away. That is $$\Phi(S_j * \overline{S}_{j+k}) + \Phi(S_{j+4*N} * \overline{S}_{j+4*N+k}) = 2*k*\Delta\phi$$

for all j,k: $j \geq i$ and $j+k<i+4*N$. Good practical choices are $j=i$ and $k=N$ (as N is usually a power of 2). Which provides us with a $\Delta\phi_{COARSE}$ estimate if no wrap-over can occur over k samples. In the presence of channel noise the phase estimate is also contaminated by noise. In order to diminish the effect of noise, estimates are computed at every new input symbol and filtering is applied to the resulting series of $\Delta\phi_{COARSE}$ estimates.

Figure 5:
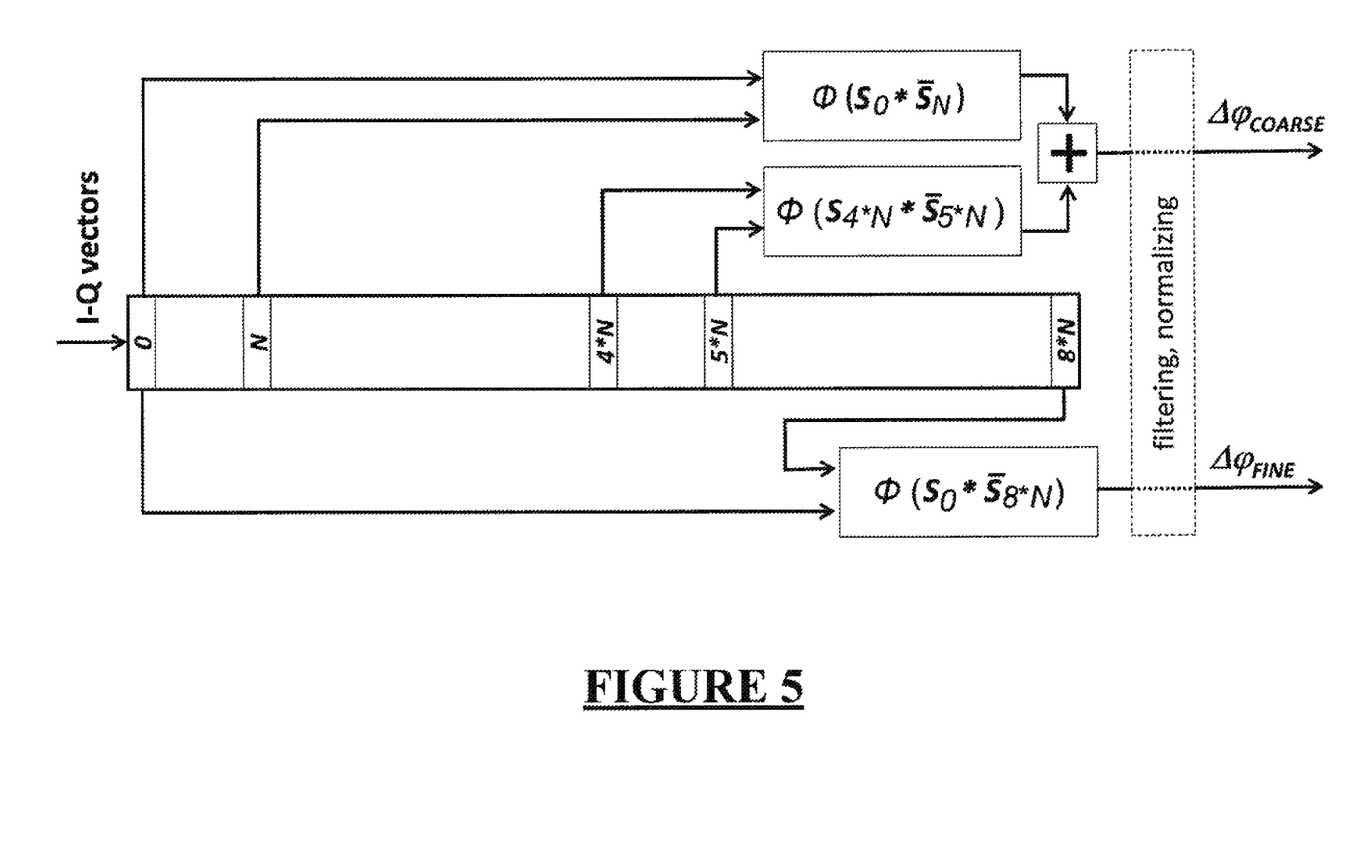
FIG. 5 illustrates a schematic representation of computations that yield the coarse and fine estimates for the sample-to-sample phase shift caused by the carrier frequency offset, according to the teachings of this disclosure.

The $\Delta\phi_{COARSE}$ and $\Delta\phi_{FINE}$ estimates can be computed in parallel as shown on FIG. 5. Conceptually the incoming I-Q symbols are shifted into a register with taps at the stages required for the phase estimations. After the register is filled a new estimate is produced at every sample shift.

Figure 6:
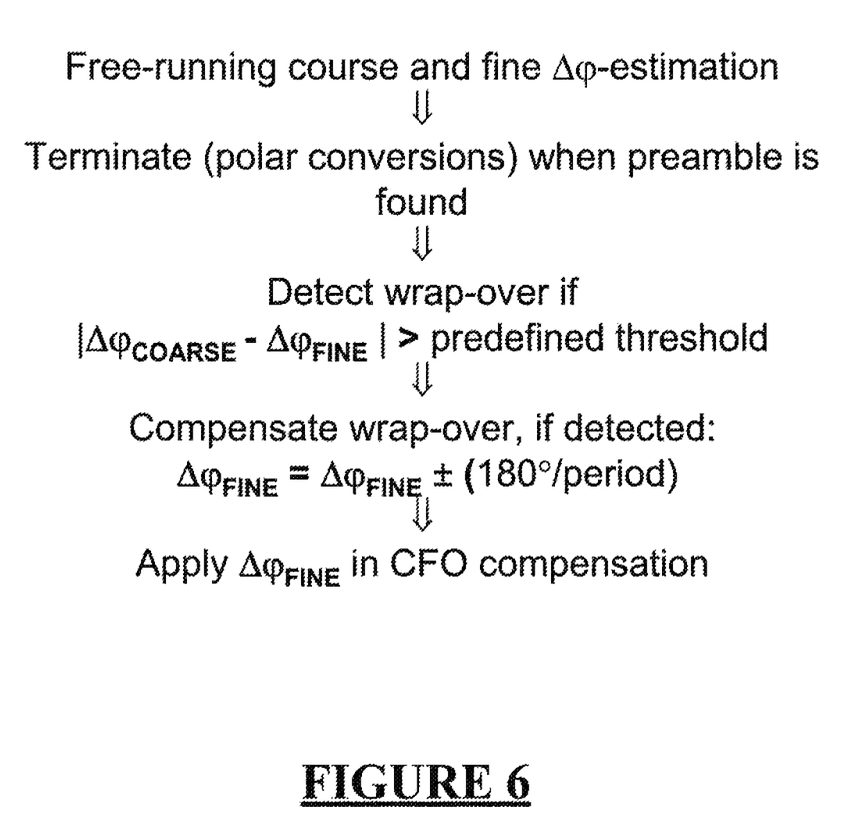
FIG. 6 illustrates a flow diagram for computing the sample-by-sample phase shift used for carrier frequency offset compensation, according to a specific example of this disclosure.
Figure 7:
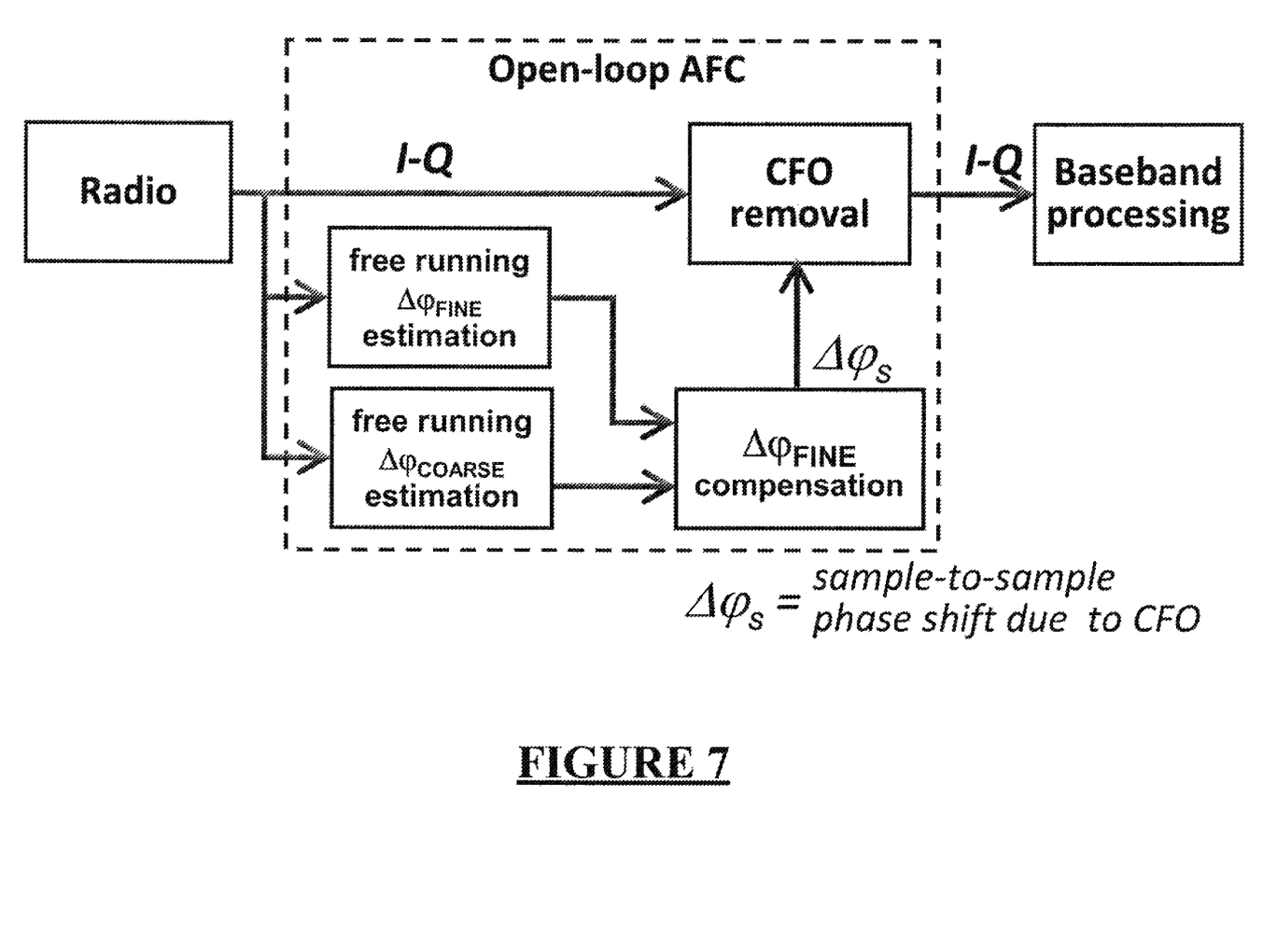
FIG. 7 illustrates a schematic block diagram of a conceptual structure of an AFC module and its placement in the digital part of the receiver, according to the specific example embodiment of this disclosure.

The flow of actions used for determining the sample-to-sample phase shift to be applied in the AFC is presented in FIG. 6 and the conceptual structure of the AFC module based on the method presented in this disclosure as well as its placement in the digital part of the receiver is depicted on FIG. 7.

Evaluation

At 2 Mbaud symbol rate the 8 symbol preamble consumes 4 μs. At 2.4 GHz the standard ±25 ppm crystal accuracy may, in the worst case, result in ±180° accumulated phase error over 4 μs. $\Delta\phi_{COARSE}$ is computed over an 500 ns (1 symbol) interval, thus in principle it could be used to detect multiple wrap-over's of $\Delta\phi_{FINE}$. In practice, however, the algorithm is implemented to relax the crystal tolerance specification to ±50 ppm (one wrap-over at each extreme) that can amount to significant cost saving in cheap mobile wireless modules.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for automatic frequency offset compensation in a zero-intermediate frequency receiver demodulating minimum-shift keying (MSK) signals, comprising the steps of:
   receiving a radio frequency (RF) signal in an automatic frequency control (AFC) module;
   running a coarse carrier frequency offset estimation of the received RF signal in said AFC module;
   running a fine carrier frequency offset estimation of the received RF signal in said AFC module;
   determining whether an expected preamble of a MSK signal has been detected, wherein
   if the expected preamble has not been detected then continue running the coarse and fine carrier frequency offset estimations, and
   if the expected preamble has been detected then stop running the coarse and fine carrier frequency offset estimations;
   calculating an absolute difference between the coarse and fine carrier frequency offset estimations in said AFC module;
   determining whether the absolute difference is less than a threshold value, wherein
   if the absolute difference is less than the threshold value then using the fine carrier frequency offset estimation for compensating the carrier frequency offset, and
   if the absolute difference is equal to or greater than the threshold value then adjusting the fine carrier frequency offset estimation by adding or subtracting 180 degrees per period thereto until the absolute difference is less than the threshold value, and thereafter using the adjusted fine carrier frequency offset estimation for compensating the carrier frequency offset.

2. The method according to claim 1, wherein the expected preamble results in a direct current (DC) free demodulated signal.

3. The method according to claim 1, wherein the expected preamble is eight MSK symbols comprising:
   four logic ones having positive phase rotations; and
   four logic zeros having negative phase rotations.

4. The method according to claim 1, wherein the MSK signals run at a two megabaud MSK symbol rate.

5. The method according to claim 1, wherein the fine carrier frequency offset estimation is determined by running autocorrelation with one preamble period time lag.

6. The method according to claim 3, wherein the coarse carrier frequency offset estimation is determined by averaging the result of running two autocorrelations four symbols apart with an MSK symbol time lag.

7. The method according to claim 6, further comprising the step of lowpass filtering the average to remove signal noise therein.

8. The method according to claim 1, wherein the coarse and the fine carrier frequency offset estimations are free running until the preamble is detected.

9. The method according to claim 3, wherein the step of compensating the carrier frequency offset is done by de-rotating a coarse I/Q waveform of the MSK symbols.

10. A zero-intermediate frequency receiver with automatic frequency offset compensation for demodulating minimum-shift keying (MSK) signals, comprising:
    an automatic frequency control (AFC) module comprising an input receiving a radio frequency (RF) signal, a coarse carrier frequency offset estimation unit coupled with said input, a fine carrier frequency offset estimation unit coupled with said input, and a carrier frequency offset removal unit receiving said RF signal;
    wherein the zero-intermediate frequency receiver is configured to determine whether an expected preamble of a MSK signal has been detected, and wherein
    if the expected preamble has not been detected the zero-intermediate frequency receiver controls the AFC module to continue to run a coarse and fine carrier frequency offset estimations, and
    if the expected preamble has been detected the zero-intermediate frequency receiver is configured to control the AFC module to stop running the coarse and fine carrier frequency offset estimations;
    wherein the AFC module is configured
    to calculate an absolute difference between the coarse and fine carrier frequency offset estimations in said AFC module;
    to determine whether the absolute difference is less than a threshold value,
    wherein
    if the absolute difference is less than the threshold value the AFC module is configured to control said carrier frequency offset removal unit to compensate the carrier frequency offset with said fine carrier frequency offset estimation, and
    if the absolute difference is equal to or greater than the threshold value the AFC module is configured to adjust the fine carrier frequency offset estimation by adding or subtracting 180 degrees per period thereto until the absolute difference is less than the threshold value, and thereafter to control said carrier frequency offset removal unit to compensate the carrier frequency offset with the adjusted fine carrier frequency offset estimation.

11. The zero-intermediate frequency receiver according to claim 10, wherein the expected preamble results in a direct current (DC) free demodulated signal.

12. The zero-intermediate frequency receiver according to claim 10, wherein the expected preamble is eight MSK symbols comprising:
    four logic ones having positive phase rotations; and
    four logic zeros having negative phase rotations.

13. The zero-intermediate frequency receiver according to claim 10, wherein the MSK signals run at a two megabaud MSK symbol rate.

14. The zero-intermediate frequency receiver according to claim 10, wherein the fine carrier frequency offset estimation is determined by running autocorrelation with one preamble period time lag.

15. The zero-intermediate frequency receiver according to claim 12, wherein the coarse carrier frequency offset estimation is determined by averaging the result of running two autocorrelations four symbols apart with an MSK symbol time lag.

16. The zero-intermediate frequency receiver according to claim 15, further comprising a lowpass filter for low pass filtering the average to remove signal noise therein.

17. The zero-intermediate frequency receiver according to claim 10, wherein the coarse and the fine carrier frequency offset estimation units are controlled to run free until the preamble is detected.

18. The zero-intermediate frequency receiver according to claim 12, wherein the carrier frequency offset removal unit is configured to de-rotate a coarse I/Q waveform of the MSK symbols.

* * * * *